(12) United States Patent
Kohen et al.

(10) Patent No.: US 7,023,166 B1
(45) Date of Patent: Apr. 4, 2006

(54) METHOD FOR TORQUE CONTROL OF AN INDUCTION MOTOR USING A VOLTAGE CONTROLLER

(76) Inventors: Albert Kohen, 6, Rue de l'Abbaye, Anthony (FR) 92160; Gérald Davy, 24, Avenue Descartes, Drancy (FR) 93700; Claude Caen, 19, Rue Hachayarot, Jerusalem (IL) 92544

( * ) Notice: Subject to any disclaimer, the term of this patent is extended or adjusted under 35 U.S.C. 154(b) by 156 days.

(21) Appl. No.: 10/018,993

(22) PCT Filed: Jun. 22, 2000

(86) PCT No.: PCT/FR00/01739

§ 371 (c)(1),
(2), (4) Date: May 17, 2002

(87) PCT Pub. No.: WO01/01559

PCT Pub. Date: Jan. 4, 2001

(30) Foreign Application Priority Data

Jun. 24, 1999 (FR) .................................. 99 08092

(51) Int. Cl.
H02P 1/24 (2006.01)
H02P 5/28 (2006.01)
H02P 7/36 (2006.01)

(52) U.S. Cl. .................... 318/727; 318/798; 318/799; 318/800; 318/801; 318/803; 318/805; 318/811

(58) Field of Classification Search ......... 318/700–811
See application file for complete search history.

(56) References Cited

U.S. PATENT DOCUMENTS

| | | | | |
|---|---|---|---|---|
| 4,227,138 A | * | 10/1980 | Espelage et al. ............ | 318/802 |
| 4,249,120 A | * | 2/1981 | Earle .......................... | 318/729 |
| 4,267,499 A | * | 5/1981 | Kurosawa ................... | 318/800 |
| 4,281,276 A | * | 7/1981 | Cutler et al. ................ | 318/803 |
| 4,418,308 A | * | 11/1983 | Bose .......................... | 318/803 |
| 4,458,192 A | * | 7/1984 | Sakamoto et al. .......... | 318/798 |
| 4,461,988 A | * | 7/1984 | Plunkett ..................... | 318/802 |
| 4,672,288 A | * | 6/1987 | Abbondanti ................ | 318/803 |
| 4,808,903 A | * | 2/1989 | Matsui et al. ............... | 318/800 |
| 4,962,339 A | * | 10/1990 | Schauder .................... | 318/798 |
| 4,996,470 A | * | 2/1991 | Rowan et al. ............... | 318/772 |
| 5,166,593 A | * | 11/1992 | De Doncker et al. ....... | 318/800 |
| 5,365,158 A | * | 11/1994 | Tanaka et al. ............... | 318/806 |
| 5,488,281 A | * | 1/1996 | Unsworth et al. ........... | 318/806 |
| 5,668,459 A | * | 9/1997 | Kim ........................... | 318/798 |
| 5,701,066 A | * | 12/1997 | Matsuura et al. ........... | 318/808 |
| 5,719,482 A | * | 2/1998 | Kunzel ....................... | 318/800 |
| 5,754,026 A | * | 5/1998 | Hampo et al. .............. | 318/802 |
| 5,852,559 A |  | 12/1998 | Li |  |
| 5,909,367 A |  | 6/1999 | Change |  |
| 6,014,006 A | * | 1/2000 | Stuntz et al. ................ | 318/804 |

(Continued)

FOREIGN PATENT DOCUMENTS

EP          0 823 776          2/1998

(Continued)

*Primary Examiner*—Marlon T. Fletcher
*Assistant Examiner*—Tyrone Smith
(74) *Attorney, Agent, or Firm*—Young & Thompson (57) ABSTRACT

A method of controlling the torque of a multiphase induction motor includes the step of energizing the stator windings of the motor from a power converter using thyristors, inserted between a multiphase main supply and the windings producing a stator current set point expressed by its amplitude and its phase, predicting phase coincidences between the stator current and the set point, and commanding the power converteer so that the windings receive current waves substantially when such coincidences occur.

12 Claims, 4 Drawing Sheets

U.S. PATENT DOCUMENTS 6,433,506 B1 * 8/2002 Pavlov et al. ............... 318/804
6,509,711 B1 * 1/2003 Zaremba ..................... 318/800
6,756,763 B1 * 6/2004 Kahlon et al. .............. 318/727

FOREIGN PATENT DOCUMENTS

JP  57-126290  8/1982

\* cited by examiner

METHOD FOR TORQUE CONTROL OF AN INDUCTION MOTOR USING A VOLTAGE CONTROLLER

This is a 371 national phase application of PCT/FR00/01739 filed 6 Jun. 2000, claiming priority to French Patent Application No. 99/08092 filed 24 Jun. 1999, the contents of which are incorporated herein by reference.

The present invention relates to a method of controlling the torque of an induction motor using a power converter of the voltage controller type using thyristors, in order to adjust the torque of the induction motor in four quadrants of a torque-speed plane. The method is remarkable in that, by minimizing losses that previously were accessible only by means of more complex equipment, such as frequency converters, it combines the use of very simple equipment with high performance in terms of motor torque and efficiency.

In the electrotechnics art, the field of torque control of induction motors has expanded considerably over the last twenty years, both from the theoretical point of view (e.g. the oriented flux control technique of BLASHKE, 1971, and the direct torque control theory of DEPENBROCK, 1988) and from the industrial point of view, since over the above period the induction motor has progressively replaced the DC motor in variable speed applications.

Very sophisticated controllers using a variable voltage and a variable frequency are known in the art. There are also simpler controllers using a variable voltage and a fixed frequency, which are not used for speed variation as such, but for starting, slowing and stopping the motor. These systems are more particularly used when the load, such as a pump or a fan, has a favorable torque-speed characteristic, with low torque at low speeds.

The fundamental superiority of the former type of controller over the latter type is that the additional adjustment parameter makes it possible to adjust the torque and the flux of the motor independently of each other, and thereby to optimize the motor's operating point, in particular from the efficiency point of view.

The principle difference between the two types of controller lies in the structure of the power converter.

Variable frequency control uses a DC voltage power supply which is generally obtained by rectifying an AC voltage and is converted to a three-phase supply with a variable frequency and a variable voltage using a fast IGBT switching bridge with rupture capacity and switching at a high frequency, i.e. from a few kHz to a few tens of kHz.

In a variable voltage controller the power converter is of the voltage controller type and is in series between the three-phase power supply and the motor. It employs slower switches with no rupture capacity, using thyristors and switching at the mains frequency, for example 50 Hz.

The difference between these two techniques, in terms of complexity, has repercussions on the cost of the equipment, both the switches themselves and the associated power filters and control circuits.

The two types of equipment, i.e. frequency converters on the one hand and voltage controllers on the other hand, therefore have different fields of use: the former type is the equipment of choice in high-performance applications, whereas the latter type is used because of its low cost.

However, advances in digital data processing circuits mean that the performance of the more complex equipment mentioned above can be approximated by combining simple and economical voltage controller type equipment with a sophisticated control circuit. The emergence of this trend is behind the subject matter of patent PCT/FR95/00817 of 20 Jun. 1995, whose title translates as "A method of controlling a voltage controller for supplying power to an induction motor".

Moreover, French patent No 2 751 808 describes a multiphase induction motor braking method characterized in that, using a voltage controller, stator current pulses are generated whose phase relative to the rotor flux is chosen so that a torque negative is generated.

In this mode of operation, using current pulses, as in the conventional mode of operation of an induction motor, the stator current can be split into two orthogonal components, of which the direct component Isd is in the direction of the rotor flux $\Phi r$ and controls its amplitude, and the orthogonal component Isq generates a torque C proportional to the flux in accordance with the equation $C/C_n = \Phi r/\Phi r_n \times Isq/Isq_n$, the index n relating to the nominal value of the variable concerned.

The condition imposed on the phase of the stator current relative to the rotor flux relates only to the sign of the torque and omits flux control. It implicitly defines an angular sector of 180° in which the flow of current is authorized, the torque generated being negative. Now, in one half of this sector, in which the projection of the stator current on the flux is negative, the flow of current reduces the flux, which is combined with its natural decrease between current pulses.

Taking into account only the criterion which consists of the sign of the torque, and omitting the criterion of maintaining the flux, to authorize the flow of current, the method as described is inevitably accompanied by a fast natural decrease in the flux, to the point at which it is eliminated, and in the torque. This compromises braking. From the above expression for the torque, the decrease in the flux very rapidly inhibits the braking action Isq, to the point at which it is eliminated.

Against this background, the object of the invention is to propose a method of controlling the torque of an induction motor, intended for use with a simple power converter, of the voltage controller type using thyristors, whose performance nevertheless remains comparable with that of an IGBT frequency converter, the method enabling independent adjustment of the torque and the flux and optimization of motor efficiency, under more advantageous economic condition.

In the above context, the invention provides a method of controlling the torque of a multiphase induction motor, the method consisting of energizing the stator windings of said motor from a controller type power converter using thyristors or the like, inserted between a multiphase main supply and said windings, characterized in that it consists in:

producing a stator current set point expressed by its amplitude and its phase referred to the rotor flux as a function of independent parameters representative of the required torque and flux, predicting phase coincidences between said stator current and said set point, and commanding said controller so that the windings receive current waves substantially when such coincidences occur.

In other words, the invention proposes a method of controlling the torque of induction motors that uses a stator current reference vector, defined for example by its polar coordinates, amplitude and angular position relative to the rotor flux, and obtained from data coming from flux and torque control loops. The method is characterized in that it cyclically scans available current directions in the motor with the two-phase supply to determine, taking account of the relative positions of the rotor flux and the supply voltage, if it is possible to equalize the positions of the current and its reference, within a defined tolerance range, and, if so, commands closing of the corresponding switches at the time required to equalize them.

The value of the angular position tolerance in accordance with the invention is set sufficiently high to authorize conduction in the motor at least once per "rotation cycle" of the mains voltage relative to the rotor flux.

The invention defines the time of closing of the switches concerned so that it precedes the time t0 at which the current wave is at a maximum by an adjustable advance Δt which is a function of the reference current.

One advantageous option is to make the rotation direction of the motor the direction opposite that which would apply in the event of direct application of the voltage from the mains supply via the continuously conducting switches of the voltage controller.

This therefore increases the aforementioned number of phase coincidences between the stator current and said set point, which increases the number of current waves received by the stator windings and therefore achieves better performance in terms of motor torque control, all other things being equal.

The voltage controller type power circuit for which the method of the invention is intended consists of a multiphase system with n phases and n static switches each including two thyristors in antiparallel disposed between the mains supply and the induction motor. The switches are connected in series with one phase of the mains supply, or possibly only of the motor; an alternative system derived from the above includes supplementary static switches using thyristors and disposed to obtain various configurations of connection of the motor to the mains.

In one such embodiment of the invention, n–1 static switches are added to the controller in a configuration enabling application of the mains voltage to the motor in both of the possible rotation directions (forward and reverse) of the multiphase mains supply voltage.

In another embodiment of the invention the controller includes $n^2$ static switches to enable the connection of each of the n phases of the motor to each of the n phases of the mains supply.

In accordance with a further feature of the invention, the motor speed is calculated from that of the rotor electromotive force measured in periods in which the switches are not conducting.

In accordance with a further feature of the invention, the motor torque is calculated from the slip of the rotor electromotive force during periods of conduction.

It is nevertheless important to point out that, because of the accuracy required for the estimate of the position of the rotor flux, this control method can be used only above a motor speed threshold $v_0$ of the order of 5% to 10% of the nominal speed, and that operation at lower speeds must be achieved by other means known in the art, for example by varying the average frequency of the current wave from zero to a value corresponding to the threshold $v_0$.

The invention will be better understood and further advantages of the invention will become more apparent in the light of the following description of various embodiments of a multiphase motor torque control system, given by way of example only and with reference to the accompanying drawings, in which.

Figure 1:
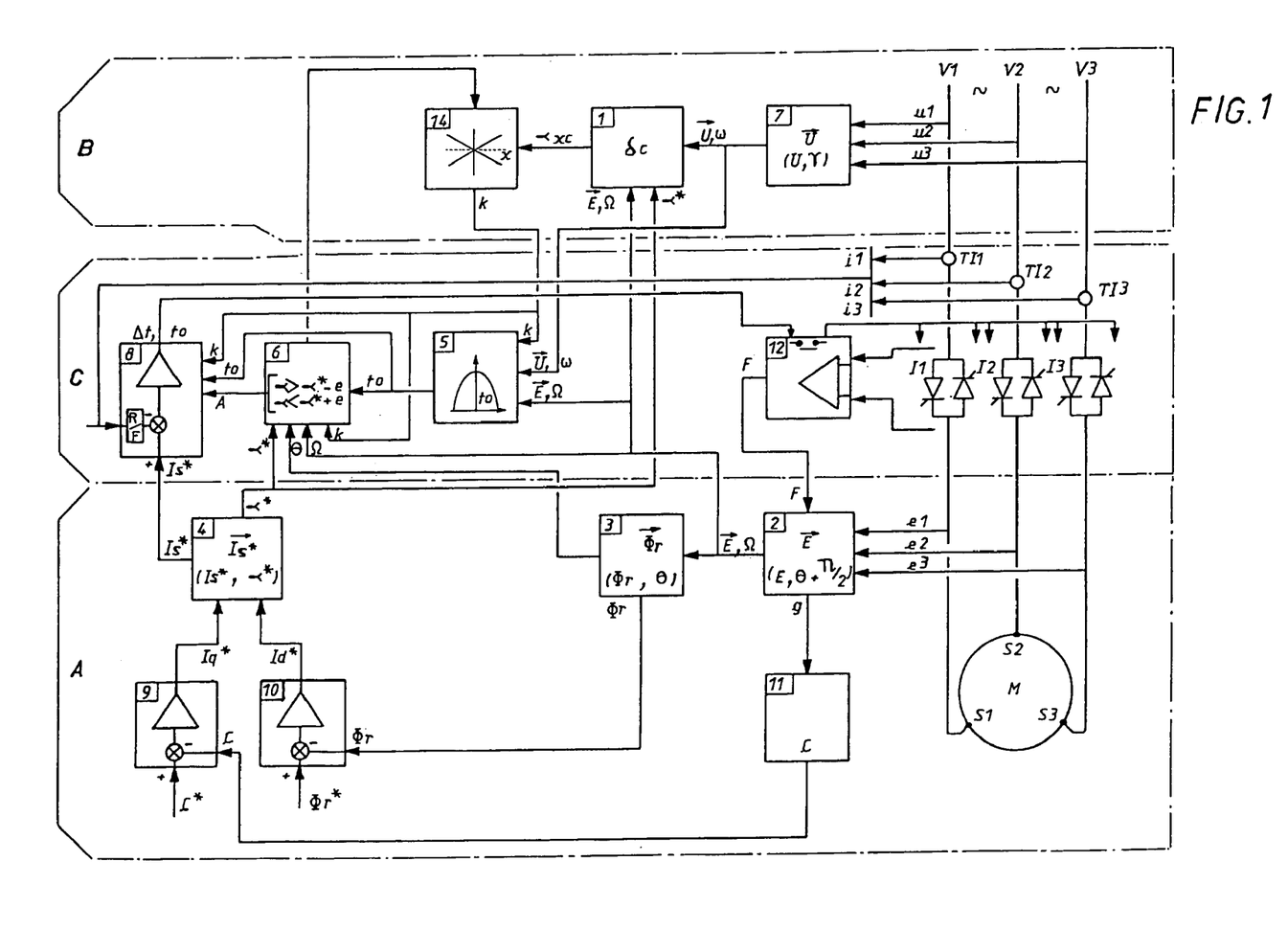
FIG. 1 is a functional block diagram of a control system for controlling the motor torque of a motor connected to a three-phase mains supply.

In the chosen embodiment shown in FIG. 1, a three-phase induction motor M has a short-circuited rotor whose three stator windings, here connected in a star configuration, are fed with power via terminals S1, S2 and S3. The terminals are connected to the conductors V1, V2, V3 of a three-phase mains supply via respective switches I1, I2, I3 each consisting of a pair of thyristors in antiparallel. The triggers of the thyristors are driven by control signals coming from an ignition control unit 8. Current transformers TI1, TI2 and TI3 are inserted in series with the conductors of the three phases, and here are on the mains supply side of the switches. FIG. 1 shows a system A for producing the stator current set point $\vec{Is^*}$, a system B for producing the stator current direction δ, and a system C for producing the conduction command for the switches I1, I2, I3. These three systems are considered in succession hereinafter, noting that most of the functions described are implemented digitally in a microcontroller, although for clarity logic and analog electronics symbols are used. Each "unit" described hereinafter can be implemented in the analog and/or digital domain; how to implement each of them will be evident to the person skilled in the art.

Figure 2:
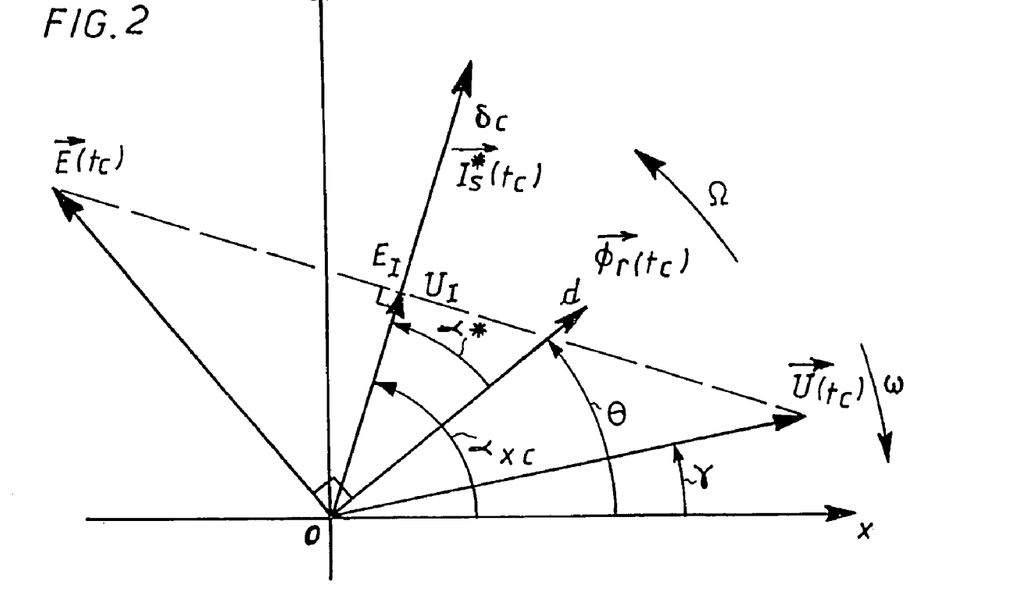
FIG. 2 is a vector diagram explaining the magnitudes of the voltage, current and flux related to the motor and those of the mains supply.

The system A for producing the stator current set point $\vec{Is^*}$ will now be described:

The two components (Id*, Iq*) of $\vec{Is^*}$ in a system of orthogonal axes (od, oq) carried by the rotor flux $\vec{\Phi r}$ are calculated independently (see FIG. 2).

Id* is the component of $\vec{Is^*}$ in the direction od of the rotor flux $\vec{\Phi r}$.

In unit 2, three measurements (e1, e2, e3) of the electromotive force of the motor are taken simultaneously on the three phases, at a time when the current is zero, as signaled by a logic variable F produced by the unit 12. When the current is zero, all the switches are open and the motor is disconnected from the mains supply. In this case F=1, for example. Using a CLARCKE transform, the Cartesian coordinates (Ex, Ey) of the rotor electromotive force vector $\vec{E}$ are deduced from these three measurements, in an orthogonal system of axes (ox, oy) linked to the stator (to be more precise to "phase 1" of the stator), as well as its polar coordinates in the same system (E, θ+π/2).

The CLARCKE transform is a matrix operation known in the art; it is described, for example, in "Introduction à l'électrotechnique approfondie" by LESENNE, NOTELET and SEGUIER.

In practice, using two measurements of $\vec{E}$ included in the same time interval in which there is no conduction, the angular speed $\Omega$ of $\vec{E}$ is calculated and, from two measurements of $\vec{E}$ situated immediately before and after a period of conduction, the slip g during that interval is calculated, and ($\vec{E}$, $\Omega$) is transmitted to the units 1 and 5, $\Omega$ to the unit 6 and g to the unit 11, respectively.

To be more precise, the CLARCKE transform applied to the voltages e1, e2, e3 measured at the terminal of the stator when there is no conduction of the thyristors, at two different times defining a time interval $\Delta t$, provides the modulus E of the vector $\vec{E}$ whose projections in the plane ox, oy are Ex and Ey, at each of those two times, i.e.

$$E = \sqrt{Ex^2 + Ey^2}$$

and its argument:

$$\frac{\pi}{2} + \theta = \text{Arc tan}\frac{Ey}{Ex}$$

where $\theta$ is the angle of the flux vector $\vec{\Phi}$ (relative to ox.

Under these conditions the angular speed of $\vec{E}$ is given by the variation of $\theta$ during $\Delta$, i.e.

$$\Omega = \frac{\Delta\theta}{\Delta t}$$

From two other measurements of e1, e2, e3, carried out immediately before and after the application of a current wave between two phases by closing two chosen switches, the same operations are repeated to deduce a new value $\Omega'$ of the angular speed of $\vec{E}$ during the time interval in which the motor is energized, from which the slip g can be deduced:

$$g = \frac{\Omega - \Omega'}{\omega n}$$

where $\omega n$ is the nominal angular speed of the multiphase mains supply.

The unit 3 calculates the rotor flux $\vec{\Phi r}$ ($\Phi r$, $\theta$) in polar coordinates in the same system of axes ox, oy by integrating the rotor electromotive force $\vec{E}$ using its coordinates (E, $\theta+\pi/2$) and its angular speed $\Omega$ and transmits $\vec{\Phi r}$ to the unit 10 and $\theta$ to the unit 6. Thus:

$$\Phi x = \int Ex dt$$

$$\Phi y = \int Ey dt$$

$$\theta = \text{Arc tan}\frac{\Phi x}{\Phi y}$$

The unit 10 is a differential input PID controller. Its "negative" input receives the modulus $\Phi 2$ from the unit 3 and its "positive" input receives a signal representative of the required flux set point $\Phi 2^*$. From the difference between the measured rotor flux $\Phi r$ and the set point $\Phi r^*$, the PID controller produces the set point for the direct component Id* of the stator current, which varies the amplitude of the flux.

The component Iq* of Is* is determined by the units 11 and 9. The unit 11 calculates the average torque C delivered by the motor from the value of the slip g transmitted by the unit 2, and transits it to the unit 9. Thus:

$$C/C_n = (E/E_n)^2 \cdot g/g_n$$

where
$C_n$ is the nominal torque of the motor,
$g_n$ is the nominal slip of the motor, and
$E_n$ is the nominal rotor electromotive force of the motor.

This amounts to deducing the torque C from the difference between the speed of the rotor electromotive force and the estimated speed of the motor.

The unit 9 is a differential input PID controller analogous to that of the unit 10. Its "negative" input receives the value of C transmitted by the block 11. Its "positive" input receives a signal representative of the set point for the required torque C*. From the difference between the measured motor torque C and the torque set point C*, the PID controller produces the set point of the orthogonal component Iq* of the stator current, which varies the torque of the motor, and transmits it to the unit 4. The sign of Iq* determines the sign of the torque, and therefore a driving or braking action, for a given rotation direction.

The unit 4 is a converter which converts Cartesian coordinates into polar coordinates. It receives the Cartesian coordinates (Id*, Iq*) of the stator current set point $\vec{Is^*}$ in the orthogonal system of axes (od, oq) carried by the rotor flux $\vec{\Phi r}$. It defines the polar coordinates (Is*, $\alpha$*) of $\vec{Is^*}$ in the same system of axes and transmits the modulus Is* to the unit 8 and the argument $\alpha$* to the units 1 and 6.

The system B for determining the direction of the current vector $\vec{Is}$ will now be described.

The unit 7 is very similar to the unit 2 previously described. It takes three measurements (u1, u2, u3) of the mains voltage on the three phases simultaneously, in a similar way to the action of the unit 2 in relation to the rotor electromotive force, and uses the CLARCKE transform to deduce therefrom the coordinates (ux, uy) of the vector $\vec{U}$ (representing the multiphase supply voltage) in the orthogonal system of axes (ox, oy) linked to the stator, as well as its polar coordinates (U, $\gamma$) in the same system, and its angular speed $\omega$. The latter corresponds to 50 Hz or 60 Hz, for example, depending on the nature of the mains supply, but measuring it means that any variation in it can be taken into account, and in particular that its "rotation" direction relative to the motor can be determined. These results are transmitted to the units 1 and 5.

Unit 1 receives (see FIG. 2):

the voltage vector $\vec{U}$ (U, $\gamma$) and its angular speed $\omega$ produced by the block 7, the rotor electromotive force vector $\vec{E}$ (E, $\theta+\pi/2$) and its angular speed $\Omega$ (assumed in this example to be of opposite sign to $\omega$), produced by the unit 2, and the argument α* of the stator current set point $\vec{Is}^*$ (Is*, α*) relative to the axis $\vec{od}$ of the rotor flux $\vec{\Phi r}$, produced by the unit 4.

It defines a theoretical direction $\vec{\delta_c}$ of the argument $\alpha_{xc}$ relative to the axis $\vec{ox}$ (stator reference) for which the directions of the current and its set point Is* would coincide, that is:

$$\alpha_{xc} - \theta(t_c) = \alpha^* \quad (FIG. 2)$$

where $t_c$ is the time of coincidence. As a general rule, the index c indicates the required coincidence.

The direction $\vec{\delta_c}$ is such that the maximum of the current that flows through it would occur at the above time $t_c$, i.e. the projection of $\overrightarrow{(U-E)}$ onto it would be zero and would have a negative derivative at that time.

Now, the projection of $\vec{E}$ onto $\vec{\delta_c}$ at time $t_c$ is:

$$E_{\delta c}(t_c) = E \sin \alpha^*$$

and that of $\vec{U}$ (FIG. 2) is:

$$U_{\delta c}(t_c) = U \cos(\omega t_c - \alpha_{xc})$$

Knowing that:

$$\gamma(t) = \omega t$$

and given that:

$$U_{\delta c}(t_c) = E_{\delta c}(t_c)$$

$t_c$ is such that:

$$\cos(\omega t_c - \alpha_{xc}) = (E/U)\sin \alpha^*$$

where:

$$\omega t_c = arc \cos[(E/U)\sin \alpha^*] + \alpha_{xc}$$

Now, the phase difference $\phi_0$ between $\vec{\Phi r}$ and $\vec{U}$ at time t=0 is:

$$\theta(t_c) = \Omega t_c + \phi_0 = \alpha_{xc} - \alpha^*$$

and, finally:

$$t_c = (\omega - \Omega)^{-1} \cdot (arc\text{-}\cos[(E/U)\sin \alpha^*] + \alpha^* + \phi_0)$$

and:

$$\alpha_{xc} = \Omega t_c + \alpha^* + \phi_0$$

subject to the condition that:

$$d/dt(U_{\delta c} - E_{\delta c}) < 0$$

The value of $\alpha_{xc}^*$ is preferably updated at least for every 30° increment of the mains voltage vector $\vec{U}$.

The value $\alpha_{xc}$ is addressed to the unit 14, which, in the manner described below, selects one of the six possible directions δ of two-phase flow of the stator current (between two windings connected to the mains supply via the controller) and transmits that information to the units 5, 6 and 8, which are described later.

Figure 3:
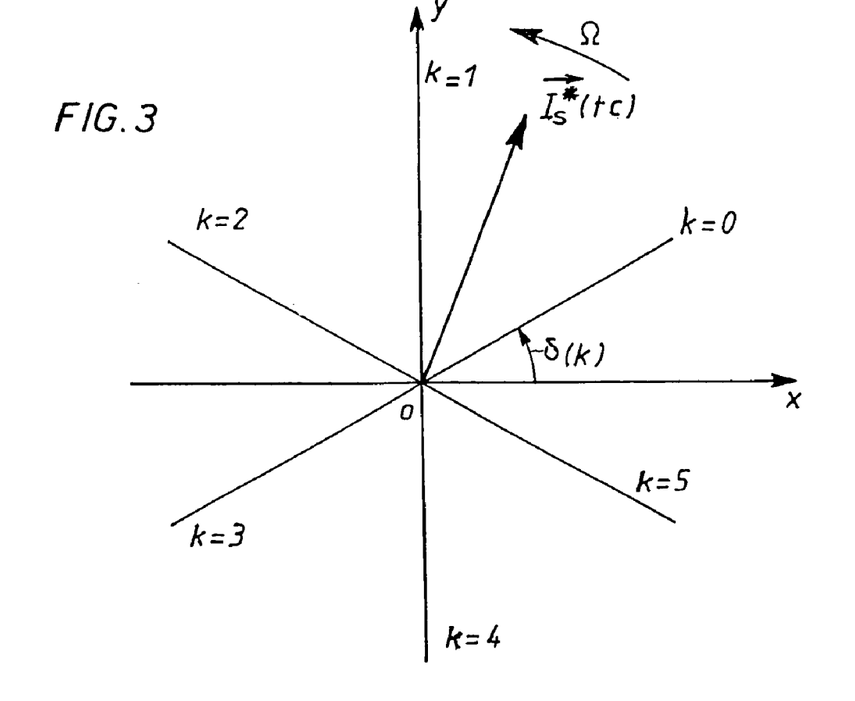
FIG. 3 is a vector diagram representing the required stator current relative to the various possible directions of the stator current vector.

Each of these directions is defined by its rank k and its polar angle δ relative to the axis ox and measured in the motor rotation direction $$\delta_{(k)} = (30° + k \cdot 60°)$$

where k is a positive integer or zero.

The rank k chosen first (i.e. as soon as the unit 14 receives a new value of $\alpha_{xc}$) is the result of dividing ($\alpha_{xc}$+30°) by the increment $\delta_{(k)}$, which here is 60°.

Thus here the rank k chosen first is:

$$\frac{\alpha_{xc} + 30°}{60°}$$

The first rank k considered is the integer part of the division, and is sent to the unit 5.

Moreover, the unit 14 may receive from the unit 6 an instruction to increment the proposed rank k.

In other words, the unit 14 is the combination of an operator capable of effecting the division indicated above and taking the integer part thereof to "propose" a value of k to the unit 5, in particular, and then to increment that value under the control of the unit 6 when the operations effected by the units 5 and 6 rule out a decision to apply a current wave to the stator at a time corresponding to the previously proposed value of k.

The system C for producing the signals controlling conduction of the switches I1, I2, I3 of the controller using thyristors will now be described.

The unit 5 receives:

the proposed index k of the direction δ(k) of the current, referred to the axis ox of the phase 1 of the motor, or stator reference, coming from the unit 14, the rotor electromotive force $\vec{E}$ (E, θ+π/2) and its angular speed Ω, produced by the unit 2, and the supply voltage $\vec{U}$ (U, γ) and its angular speed ω, produced by the unit 7.

It determines the time t0 at which a current wave in the direction δ is at a maximum, characterized by the fact that at this time the projection of $(\vec{U} - \vec{E})$ on δ is zero and its derivative is negative.

It transmits the value of t0 to the units 6 and 8.

The unit 6 receives:

the proposed index k of the direction δ(k) of the current referred to the axis ox of the phase 1 of the motor, from the unit 14, the position θ of the flux $\vec{\Phi r}$ in the same system of axes, coming from the unit 3, and its angular speed, equal to that Ω of the rotor electromotive force E, coming from the unit 2, and the position α* of the stator current set point Is* referred to the axis od of the rotor flux $\vec{\Phi r}$, produced by the unit 4.

The unit 6 uses these parameters to verify if the position α of the current $\vec{Is}$ relative to the flux $\Phi r$ that can be achieved for the time to at which the current will be at a maximum (value determined by the unit 5), i.e.

$$\alpha = [\delta_k - \theta_{(t0)}]$$

is compatible with the position α* of the current set point $\vec{Is}$, given the chosen tolerance e. It is compatible if α is in the range:

$$\alpha^* - e < \alpha < \alpha^* + e$$

In other words, e represents the maximum difference tolerated between the value of α and its set point α*.

In practice, e is a chosen criterion. The greater the value of e, the greater the chance of finding an "acceptable" proposition k. On the other hand, if e is small, the switches will be triggered more rarely but torque control will be more efficient.

Be this as it may, the parameter e is chosen to command said controller at least once during each rotation cycle of the mains voltage around the rotor flux.

If the unit 6 determines that the above double inequality is verified, it produces a conduction authorization logic signal A, for example A=1, which is transmitted to the unit 8.

If not (A=0), the unit 6 sends a signal for incrementing the index k (in the direction of Ω) to an input of the unit 14. The calculations performed by the units 5 and 6 are repeated from this value of k until A=1 or until the unit 1 "proposes" a new value of $\alpha_{xc}$.

To summarize, said controller is commanded if the angle (α) between said stator current and the average position of the rotor flux during the period of a corresponding wave is in a tolerance window defined by the following condition:

$$\alpha^* - e < \alpha < \alpha^* + e$$

The unit 8 receives:

the index k of the direction δ(k) of the current, referred to the axis ox of the phase 1 of the motor (stator reference), coming from the unit 14, the time t0 at which the presumed current is at a maximum, coming from the unit 5, the conduction authorization A, coming from the unit 6, the amplitude Is* of the current set point, coming from the unit 4, and three current measurements i1, i2, i3, coming from the transformers TI1, TI2, TI3, respectively.

If A=1, it commands the closing of the switches corresponding to the direction δ for the time t0–Δt, by transmitting an instruction to the unit 12; the value of the advance Δt that varies the amplitude of the current wave is produced by a PID controller from the difference between the set point Is* and its measured value, obtained from the phase currents i1, i2, i3.

The unit 8 includes a differential input PID controller, like the units 9 and 10, and a combination of a three-phase rectifier R and low-pass filter F whose output is connected to the "negative" input of the controller.

The "positive" input receives the set point Is* from the unit 4.

The current measurements i1, i2 and i3 are applied to said rectifier-filter combination R/F, which supplies a signal proportional to the measured current.

If A=1, the unit 8 produces an instruction commanding closing of the switches corresponding to the direction δ for the time $t_0 - \Delta t$. That instruction is transmitted to the unit 12. The value of the advance Δt that varies the amplitude of the current wave is produced by the PID controller from the difference between the two signals supplied to its differential input.

If A=0, the unit 8 inhibits control of the switches of the direction δ.

The unit 12 receives:

the voltages at the terminals of the switches I1, I2, I3, and the instruction commanding the switches, coming from the unit 8.

According to the conduction state of the switches, it monitors the transmission of the conduction instruction to the switches corresponding to the direction δ.

Moreover, when none of the switches is conducting, it delivers to the unit 2 a logic signal F=1.

Figure 4:
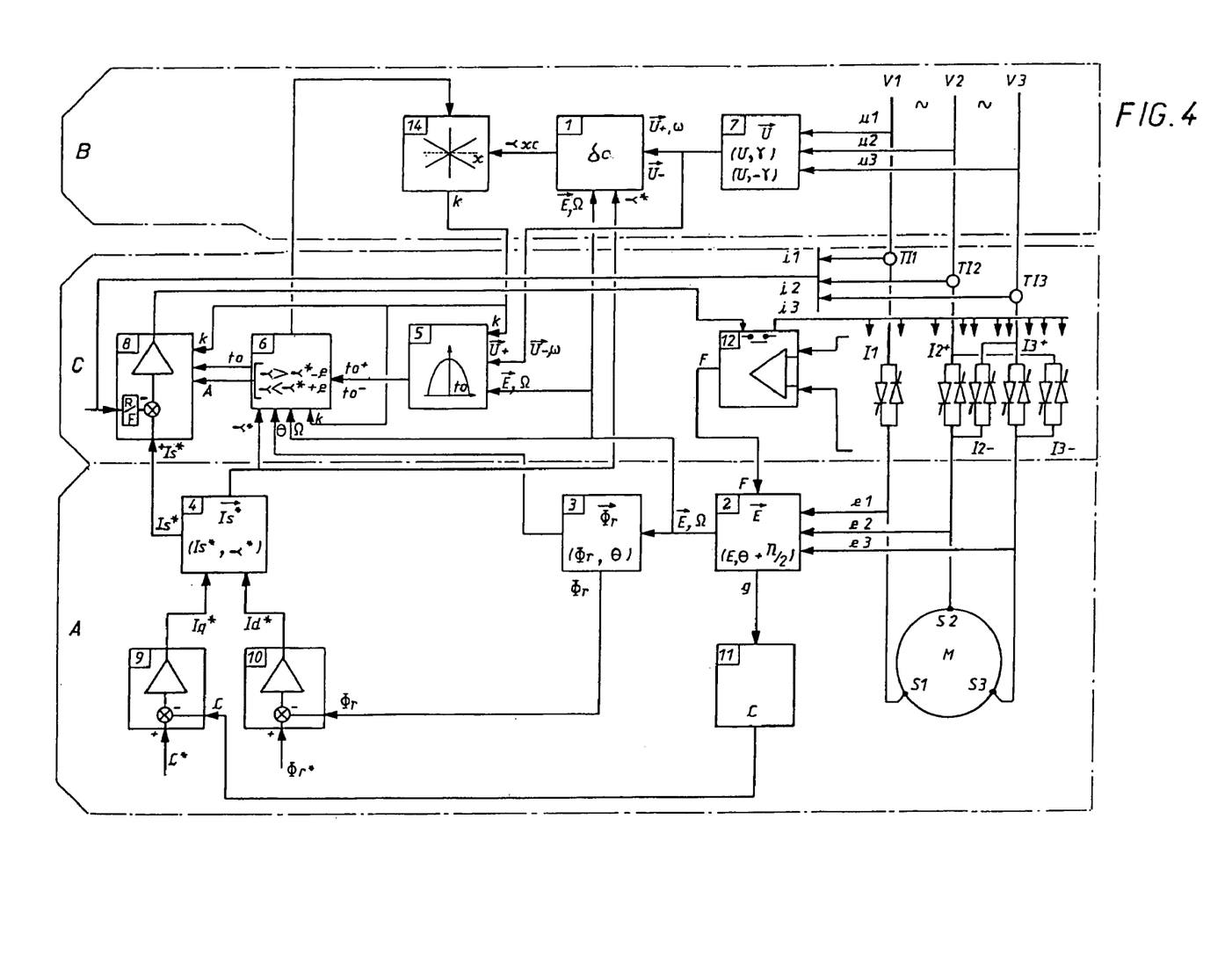
FIG. 4 is a block diagram analogous to that of FIG. 1, explaining a first variant.

FIG. 4 shows a variant of the induction motor torque control system associated with a controller employing five switches each using two thyristors in antiparallel connected to a three-phase mains supply. The two switches I2 and I3 of phases 2 and 3 from FIG. 1 are replaced in FIG. 4 by four switches I2+, I3+, I2–, I3– for reversing the connection of phases 2 and 3 of the mains supply to the motor. Accordingly, for a multiphase mains supply with n phases, 2n–1 bidirectional switches using thyristors are employed, connected and controlled to provide both possible directions of rotation (forward and reverse) of the voltage of the multiphase mains supply. Thanks to these two supplementary inverter switches, there are available at all times two voltage vectors $\vec{U}+$ and $\vec{U}-$ turning in opposite directions, symmetrically with respect to the axis ox, and whose polar coordinates (U, γ) and (U, –γ) are calculated in the unit 7 as previously.

Operation with five switches is deduced from the foregoing description in respect of its essential functions, subject to the following differences:

The two voltage vectors are processed independently, one after the other, in the same way as the single vector of the previous example. The associated variables are assigned a + or – index according to where they belong.

In particular, the unit 6 determines two arguments α+ and α– from t0+ and t0–, respectively, and applies the double inequality criterion to them. If both tests give a positive result, i.e. if there is "concurrence" between the two vectors, for the same direction δ(k), the better one is chosen, i.e. that with the minimum difference (α–α*).

Figure 5:
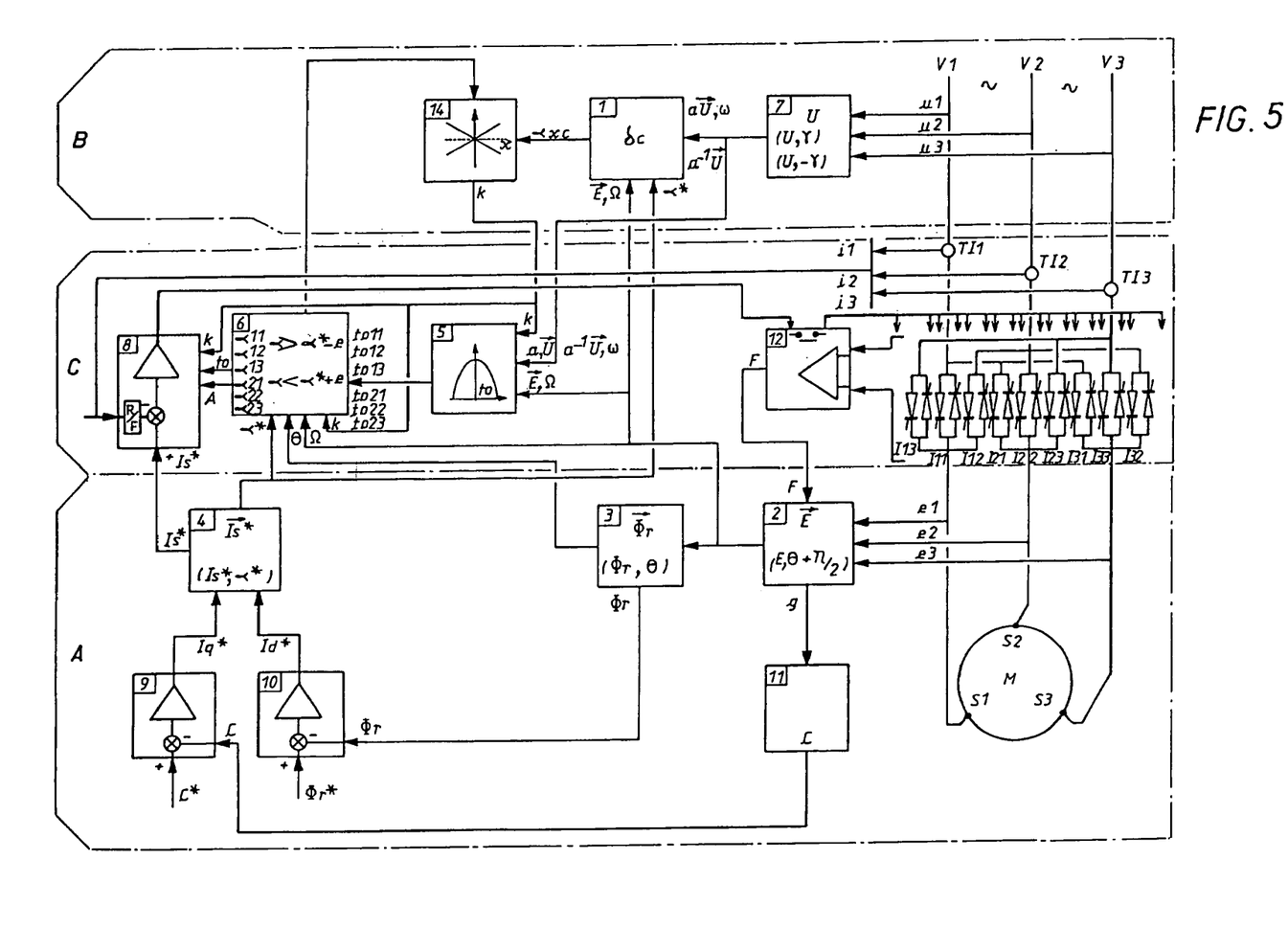
FIG. 5 is another block diagram analogous to that of FIG. 1, explaining a second variant.

FIG. 5 shows another induction motor torque control system, associated with a controller employing nine switches each using two thyristors in antiparallel, connected to a three-phase mains supply. In this configuration, each of the three phases S1, S2, S3 of the motor can be connected to each of the three phases V1, V2, V3 of the mains supply by three switches I11, I12, I13 or I21, I22, I23 or I31, I32, I33. As a result, for the voltage vector $\vec{U}$ in FIG. 1 there are substituted two groups $a\vec{U}$ and $a^{-1}\vec{U}$ each of three vectors, with a phase difference between them of 120° in the same group, each group turning in the opposite direction to the other, and whose polar coordinates are calculated in the unit 7 allowing for the fact that:

$$a = e^{j2k\pi/3}$$

where e is the base of natural logarithms and k is an integer with values from 0 to 2.

In other words, for a multiphase mains supply with n phases, said controller includes $n^2$ bidirectional switches using thyristors, connected and controlled so that each phase of the motor can be connected to each phase of the mains supply and thereby provide, for the voltage applied to the motor, two groups each of n multiphase voltages, with a phase difference between them of 360°/n within the same group, each group turning in the opposite direction to the other.

Operation with nine switches is similar to the foregoing operation, subject to the following remarks:

The voltage vectors of the two groups are processed independently, one after the other, in the same way as the single vector of the first example. The associated variables are assigned an index 11, 12, 13 for the first group or 21, 22, 23 for the second group, according to where they belong.

In particular, unit 5 determines six times t011, t012, t013, t021, t022, t023 at which the current waves are at a maximum in the direction δ, associated with the six vectors of the two groups $\overrightarrow{aU}$ and $\overrightarrow{a^{-1}U}$ each of three vectors.

The unit 6 applies the double inequality criterion to the six arguments α11, α12, α13, α21, α22, α23 deduced from t011, t012, t013, t021, t022 and t023, respectively. If two or more tests give a positive result, i.e. if there is "concurrence" between a plurality of vectors for the same direction δ(k), it chooses the best of them, i.e. the one which has the minimum difference (α−α*).

What is claimed is:

1. A method of controlling torque of a multiphase induction motor, the method consisting of energizing stator windings of said motor from a controller type power converter using thyristors, inserted between a multiphase main supply (V1, V2, V3) and said windings (S1, S2, S3), said method comprising steps of:
    producing a stator current set point expressed in terms of amplitude (Is*) and phase (α*) referred to rotor flux as a function of independent parameters (C*, Φr*) representative of the required torque and flux,
    predicting phase coincidence between said stator current and said set point, and
    commanding (8) said controller so that the windings receive current waves when such coincidences occur within a predefined tolerance range.

2. A method according to claim 1, characterized in that said controller is commanded when an angle (α) between said stator current and the average position of the rotor flux during a corresponding wave is in a tolerance window defined by a condition:

$$\alpha^* - e < \alpha < \alpha^* + e$$

where e is a predetermined parameter and α* is said phase of said stator current set point.

3. A method according to claim 2, characterized in that said parameter (e) is set so that said controller is commanded (I1, I2, I3) at least once in each rotation cycle of the mains voltage around the rotor flux.

4. A method according to claim 1, characterized in that the rotation direction of the motor (M) is chosen to be the opposite of that which would apply in the event of direction application of the multiphase voltage of the main supply (V1, V2, V3) via the continuously conducting switches of said voltage controller.

5. A method according to claim 1, characterized in that, for a multiphase mains supply with n phases, 2n−1 bidirectional switches using thyristors are employed, connected and controlled to provide the two possible rotation directions (forward and reverse) of the multiphase mains voltage.

6. Method according to claim 1, characterized in that, for a multiphase mains supply with n phases, said controller includes $n^2$ bidirectional switches employing thyristors, connected and controlled so that each phase of the motor can be connected to each phase of the mains supply and thereby provide, for the voltage applied to the motor, two groups each of n multiphase voltages, with a phase difference between them of 360°/n in the same group, each group turning in the direction opposite to the other.

7. A method according to claim 2, characterized in that the average position of the rotor flux during the duration of the current wave is considered as equivalent to its position at the time at which the current wave is at a maximum.

8. A method according to claim 7, characterized in that the amplitude of the current waves and the stator current set point (Is*) are equalized by adjusting the time difference (Δt) between application of the command to said controller, and consequently the start of the current wave, and the time (t0) at which said wave is at a maximum.

9. A method according to claim 1, characterized in that the rotor electromotive force is determined from measured stator voltages (e1, e2, e3) in the same time interval in which the controller is not conducting and in that the speed of said electromotive force is used to represent the estimated speed of the motor.

10. The method according to claim 9, characterized in that two series of stator voltages (e1, e2, e3) are respectively measured immediately before and after conduction of said controller, in that a speed of said rotor electromotive force during conduction is deduced therefrom, and in that the torque is deduced from the difference between said speed of the rotor electromotive force and the estimated speed of the motor.

11. A method according to claim 2, characterized in that the rotation direction of the motor (M) is chosen to be the opposite of that which would apply in the even of direct application of the multiphase voltage of the main supply (V1, V2, V3) via the continuously conducting switches of said voltage controller.

12. A method according to claim 3, characterized in that the rotation direction of the motor (M) is chosen to be the opposite of that which would apply in the event of direction application of the multiphase voltage of the main supply (V1, V2, V3) via the continuously conducting switches of said voltage controller.

* * * * *